Nov. 18, 1958    E. SCHAFRANIK    2,860,930
METHODS AND DEVICES FOR PRE-LOADING BEARINGS
Filed Sept. 22, 1954
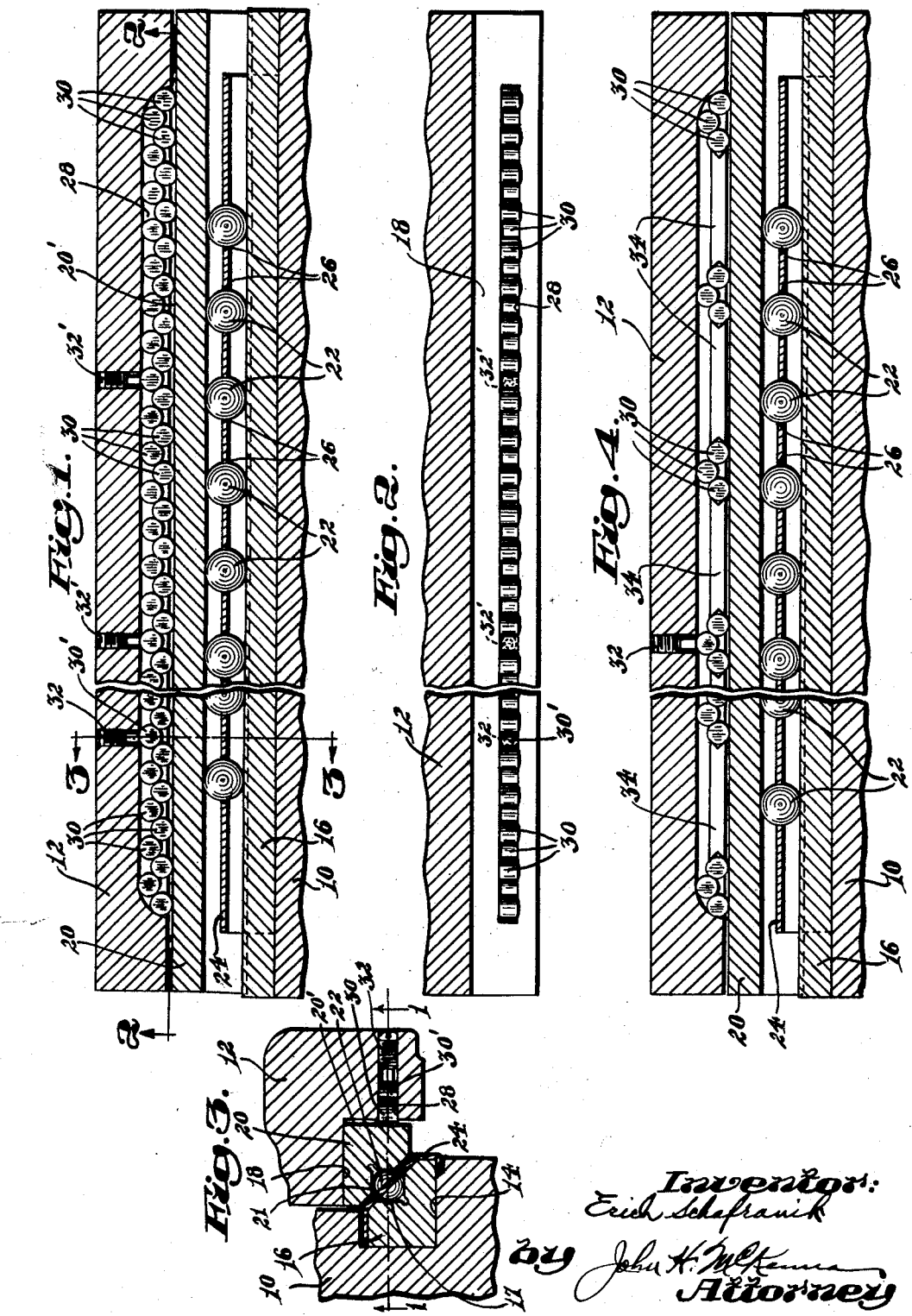

United States Patent Office 2,860,930
Patented Nov. 18, 1958

2,860,930

METHODS AND DEVICES FOR PRE-LOADING BEARINGS

Erich Schafranik, Providence, R. I., assignor to Abrasive Machine Tool Company, East Providence, R. I., a corporation of Rhode Island Application September 22, 1954, Serial No. 457,755

5 Claims. (Cl. 308—6)

This invention relates to improvements in methods and devices for pre-loading bearings. More particularly the invention provides an improved method and means for pre-loading bearings of the general types employed between relatively slidable elements and parts of machines whose movable elements or parts may be mounted for travel in straight or curving lines. Also, the invention may be utilized with advantage for pre-loading bearings having generally circular arrangement between relatively rotating elements.

Pre-loading of bearings frequently is made necessary or desirable because of unavoidable inaccuracies of dimensions and relationships of machined surfaces and parts which are mounted for relative movements, and various pre-loading procedures and devices are well known. The present invention improves upon the prior proposals by making it possible and commercially feasible to pre-load bearings more effectively and more economically as compared with any of the prior comparable procedures and devices of which I am aware.

Heretofore, it has been conventional practice, in the case of bearings for relatively slidable machine elements, to pre-load the bearings by means of gib strips through which varying degrees of pressure may be applied to relatively slidable elements by tightening set-screws or the like which may be suitably distributed at intervals along a gib strip. The gib strip method of pre-loading bearings has proven fairly satisfactory but, when the gib strips are of a preferred tapering variety, there are definite limitations upon the length of bearings which can be pre-loaded in accordance with prior gib strip procedures. Also, particular ones of the distributed set screws may be tightened more or less than others which results in an unequal distribution of the pre-loading pressures.

Pre-loading of prior circular bearings, such as ball bearings, customarily has been accomplished by forcing one ball race toward the coacting ball race by means of set screws, or the like, and here again unequal distribution of the pre-loading pressures frequently occurs.

It is among the objects of the invention to provide a bearing pre-loading method and means whereby straight, or curving, or circular, bearings may be more effectively and more uniformly pre-loaded to suit particular requirements, as compared with prior bearing pre-loading procedures. The invention provides for applying predetermined substantially uniformly distributed pre-loading pressure to a bearing member, such as a ball race, for example, by means of a multiplicity of thrust elements confined in a space adjacent to the said bearing member and extending substantially throughout the extent of said bearing member, all or groups of said thrust elements being crowded together in said confining space with some of said thrust elements in contact with said bearing member and supporting others out of contact therewith, whereby pre-loading pressure applied to one of said out-of-contact thrust elements is transmitted through said elements and applied substantially uniformly to said bearing member at distributed locations of contact of particular ones of said thrust elements with said bearing member.

Another object of the invention is to provide a bearing pre-loading method and means whereby a bearing member which constitutes a ball bearing race, or the like, is backed by a multiplicity of thrust elements crowded together in a confining space with alternate ones of said elements in contact with said bearing member and alternate ones supported by adjacent elements out of contact therewith, whereby a manual means for applying pressure to one of the said supported out-of-contact elements effects predetermined substantially uniform pre-loading of the bearing with the pre-loading pressure transmitted to all of the in-contact thrust elements through the supported out-of-contact elements.

Yet another object of the invention is to provide a bearing pre-loading device wherein a multiplicity of cylindrical rollers are confined within a space behind a bearing member with alternate rollers in contact with the bearing member and alternate rollers supported by adjacent rollers out-of-contact with the bearing member, and wherein substantially uniform distributed pre-loading of the bearing may be accomplished by subjecting one or a plurality of the out-of-contact rollers to a predetermined amount of pressure which becomes distributively transmitted to the bearing member at the locations of the in-contact rollers.

It is, moreover, my purpose and object generally to improve bearing pre-loading procedures and devices and more especially to provide for more effectively and more uniformly transmitting pre-loading pressures to a bearing member, as compared with prior pre-loading procedures.

In the accompanying drawing:

Fig. 1 is a cross-sectional view of two relatively slidable members of a machine at the location of one of two similar linear ball bearings which extend in parallelism in a common horizontal plane at spaced locations, the section being on line 1—1 of Fig. 3;

Fig. 2 is a cross-sectional view on line 2—2 of Fig. 1;

Fig. 3 is a cross-sectional view on line 3—3 of Fig. 1 but turned clockwise through 90°; and Fig. 4 is a view similar to Fig. 1 but showing a modified form of the invention.

Referring to the drawing, the invention is illustrated in its embodiment in a machine having two machine parts 10, 12 which are relatively slidable, one upon the other, with anti-friction bearing means between them. For example, the part 10 may be a machine tool member on which the part 12 is slidable as a table member or cross-slide member.

As herein represented, opposite sides of the member 10 are grooved at 14, only one side being shown in the drawing, and a race strip 16 is seated in each groove 14 and secured against movement therein by any suitable means (not shown).

An under portion of member 12 is grooved at 18 at opposite sides of the member, only one side being shown, and a race strip 20 is mounted in each groove 18 and retained against longitudinal movement therein by any suitable means (not shown). However, the race strips 20 are mounted in the grooves 18 for permissible restricted movement in directions generally toward and from the adjacent race strips 16.

As best seen in Fig. 3, a race strip 16 is generally opposite a race strip 20, and the opposed faces of the adjacent race strips are longitudinally grooved at 17 and 21 respectively. Bearing balls 22 are distributed along the opposite grooves 17, 21 in engagement with walls of the grooves of both race strips, the balls 22 maintaining the adjacent strips 16, 20 in suitably spaced relation so that the member 12 is supported on the distributed balls 22 at opposite sides of the member 10. Preferably, a ball retainer 24 has a series of suitably spaced holes 26 therein within each of which one of the bearing balls 22 loosely engages, the retainer being free to move longitudinally between the race strips 16, 20 to maintain a predetermined spacing of the bearing balls as the balls roll in one direction or the other along the race strips 16 in response to a sliding movement of member 12 relative to member 10.

According to the invention, each race strip 20 provides a wall 20' behind which the member 12 is longitudinally grooved at 28 to provide a confining space within which a multiplicity of thrust elements 30 are confined in crowded-together relation. As represented, the thrust elements 30 are short cylindrical rollers whose crowding within groove space 28 is such that alternate ones of the thrust elements are in engagement with the wall 20' and other alternate ones are in contact with the bottom wall of the groove 28 in member 12, with each pair of adjacent rollers which are in contact with the same one of said walls supporting and maintaining an intermediate roller in contact with the other of said walls. Hence, if any one of said thrust elements is forced in direction toward the wall with which it is out of contact, all of the thrust elements become more tightly crowded together in said groove space 28, and increased distributed pressure becomes applied to movable wall 20' tending to move it toward the adjacent race strip 16 with resulting application of pre-loading pressure to the bearing balls 22 relatively uniformly at each of the distributed locations of the thrust elements which are in contact with wall 20'. In the drawing, a set screw 32 is adjustable in member 12 at the location of the thrust element 30' by means of which the thrust element 30' may be forced further between the two thrust elements in contact with the element 30' to accomplish a said relatively uniformly distributed pre-loading of the bearing between members 10, 12. While a single set screw 32 will suffice in many cases, it may be found desirable to provide an additional set screw or set screws 32' when any particular bearing or bearings have substantial length.

It will be obvious that the thrust elements 30, 30' need not be cylinders but might be balls or elements having hexagonal cross-section; it being essential only that the thrust elements be capable of being crowded together, more or less, within a confining space in response to pressure applied to any one or any spaced plurality of the thrust elements.

Also, it should be understood that the invention is in no sense limited to bearings for members having relative movement in a straight line or in a single plane. Obviously, the grooves 14, 18 in members 10, 12 may have extent on any desired curvatures and the race strips 16, 20 may be correspondingly curved to provide for sliding movements of member 12 in a curved path.

Furthermore, the disclosure is applicable to circular bearings. For example, in Fig. 3, the grooves 14, 18 in members 10, 12 may extend circularly around the respective members 10, 12 in a horizontal plane with the member 12 annularly supported on a circular ball bearing for rotation about the axis of the circular bearing, in which case the pre-loading of the circular bearing would be accomplished in the same manner as described in connection with Figs. 1-3.

Fig. 4 illustrates a modification in which spaced groups of the thrust elements 30 are separated by spacing struts 34 which transmit pressure applied to any one or more of the thrust elements to the separated groups of thrust elements. The pre-loading action in Fig. 4 is substantially the same as described in connection with the Figs. 1-3 embodiment.

Various changes may be made in the details of the disclosed invention without departing from the spirit and scope of the invention as defined in the appended claims, and it is intended that the patent shall cover by suitable expression in the appended claims whatever features of patentable novelty exist in the invention disclosed.

I claim as my invention:

1. In a bearing having anti-friction bearing elements between and distributed along a substantial portion of the extent of two members of which one is adapted to be driven relative to the other, means constituting a race strip engaging all of said anti-friction bearing elements and mounted for limited movements relative to said members in directions toward and from said anti-friction bearing elements, means defining a space between said race strip and one of said members, a multiplicity of thrust elements confined and crowded together within said space with alternate ones of the thrust elements engaging said race strip and supporting intervening thrust elements in engagement with said one of said members, and manually operable means for applying pressure to only one of a multiplicity of said intervening thrust elements thereby to apply distributed substantially equalized pressure to said race strip throughout a substantial portion of the extent of the said race strip where said multiplicity of intervening thrust elements are supported by said wall-engaging thrust elements.

2. In a bearing having anti-friction bearing elements between and distributed along a substantial portion of the extent of two members of which one is adapted to be driven relative to the other, means constituting a race strip engaging all of said anti-friction bearing elements and mounted for limited movements relative to said members in directions toward and from said anti-friction bearing elements, means defining a space between said race strip and one of said members, said space extending substantially throughout the extent of said race strip, a multiplicity of thrust elements confined in crowded-together relation within said space with successive ones of the thrust elements alternately engaging said race strip and said one of said members whereby adjacent thrust elements which are in engagement with said race strip maintain an intervening thrust element in engagement with said one of said members and adjacent thrust elements which are in engagement with said one of said members maintain an intervening thrust element in engagement with said race strip, and manually adjustable means at only one of said thrust elements for varying the pressure exerted by each thrust element on each other thrust element thereby to vary the distributed pressure exerted on said race strip by the thrust elements which are in engagement therewith.

3. In a bearing having anti-friction bearing elements between and distributed along a substantial portion of the extent of two members of which one is adapted to be driven relative to the other, means constituting a race strip engaging all of said anti-friction bearing elements and mounted for limited movements relative to said members in directions toward and from said anti-friction bearing elements, means defining a space between said race strip and one of said members, said space extending substantially throughout the extent of said race strip, a multiplicity of thrust rollers confined in crowded-together parallelism within said space with successive thrust rollers alternately engaging said race strip and said one of said members whereby the thrust rollers which engage said race strip maintain intervening thrust rollers in engagement with said one of said members and the thrust rollers which engage said one of said members maintain intervening thrust rollers in engagement with said race strip, and manually operable means for applying force directly to only one of said thrust rollers thereby to force it between two others for increasing the distributed pressure exerted on said race strip by all of the thrust rollers in engagement therewith.

4. In a machine having two members of which one is mounted for sliding movements on the other and having anti-friction bearing elements engaged between said members, means for effecting predetermined pre-loading of the bearing provided by said bearing elements, comprising a race strip between said members in engagement with all of said bearing elements and mounted for limited movements relative to said members in directions toward and from said bearing elements, means defining a space between said race strip and one of said members, said space extending throughout a substantial portion of the extent of said one of the members, thrust elements confined and crowded together within said space with alternate thrust elements engaging said race strip and said one of the members whereby the thrust elements mutually support and maintain each other in engagement respectively with said race strip and said one of said members, and manually adjustable means for applying pressure to only one of said thrust elements thereby to increase the distributed pressure exerted on said race strip by all of said thrust elements in engagement therewith.

5. The method of pre-loading a bearing having anti-friction elements between two relatively movable members, comprising arranging a race strip in contact with all of the anti-friction elements, providing a multiplicity of thrust elements in confined crowded-together relation between the race strip and one of said members with alternate thrust elements in contact with said race strip and supporting intervening thrust elements in contact with said one of the members, and applying pressure to only one of said intervening thrust elements to effect substantially uniformly distributed pre-loading of the bearing with the said applied pressure distributively transmitted to said race strip at the locations of contact of said alternate thrust elements therewith.

References Cited in the file of this patent

UNITED STATES PATENTS

| | | |
|---|---|---|
| 1,320,836 | Brinkman | Nov. 4, 1919 |
| 1,443,789 | Humphreys | Jan. 30, 1923 |
| 2,244,434 | Shaw | June 3, 1941 |
| 2,526,518 | Turrettini | Oct. 17, 1950 |

FOREIGN PATENTS

| | | |
|---|---|---|
| 245,763 | Switzerland | Aug. 16, 1947 |